UNITED STATES PATENT OFFICE.

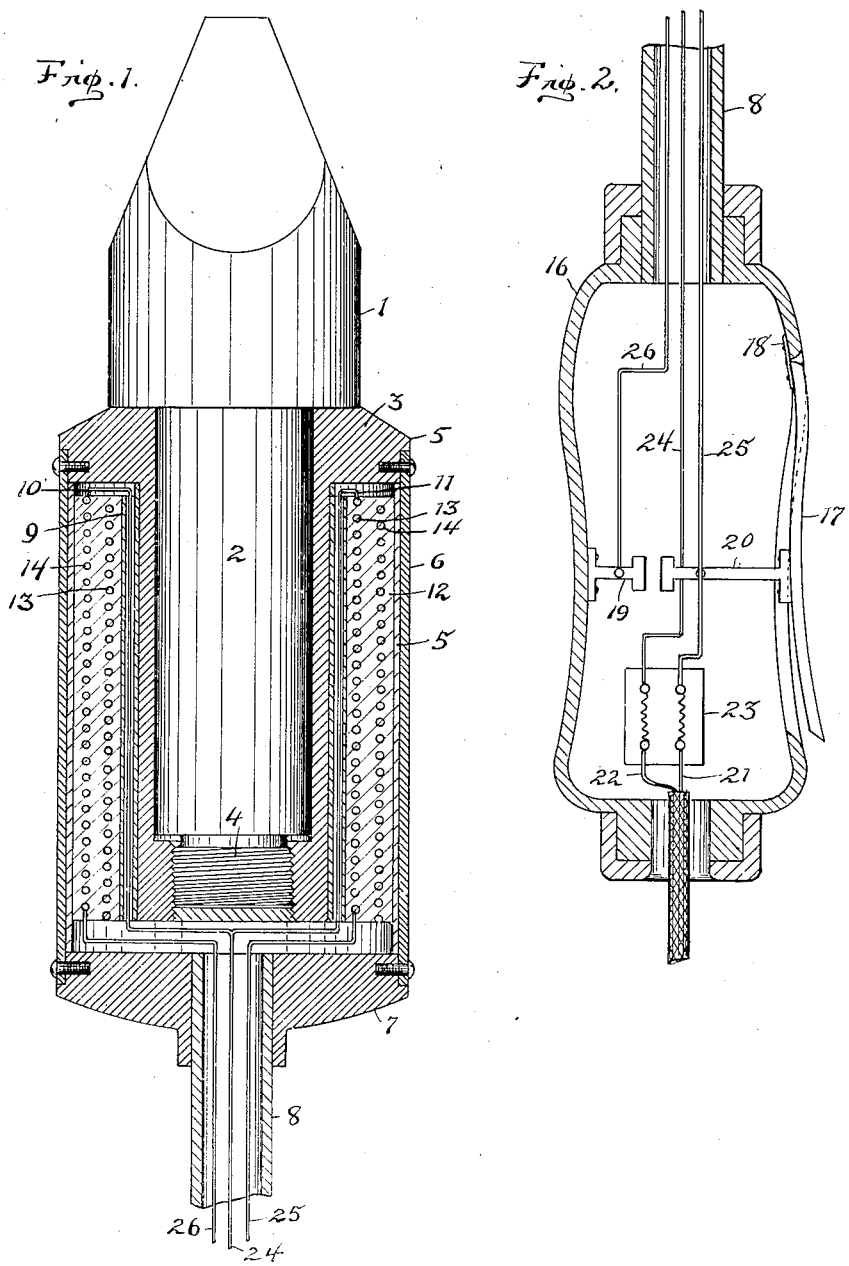

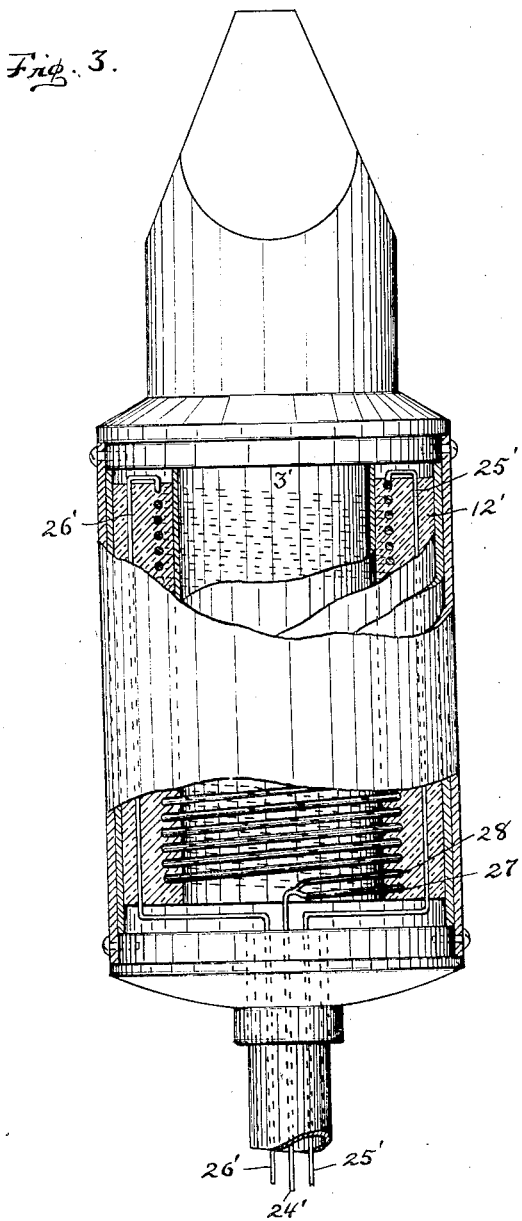

WILLIAM A. BRAUN, OF DOVER, OHIO.

ELECTRIC SOLDERING IRON.

1,407,722.   Specification of Letters Patent.   Patented Feb. 28, 1922.

Application filed October 22, 1919. Serial No. 332,508.

*To all whom it may concern:*

Be it known that I, WILLIAM A. BRAUN, a citizen of the United States of America, and resident of Dover, in the county of Tuscarawas and State of Ohio, have invented certain new and useful Improvements in Electric Soldering Irons, of which the following is a specification.

This invention relates to improvements in electrical soldering irons, and the objects thereof are to construct the device so that its various parts may be disassembled and the soldering point and the heating element replaced by renewal parts as occasion may arise; to so arrange the heating element and control the current for exciting it that several different degrees of heat may be maintained as required; and to provide means for automatically controlling the current utilized in attaining the greater degrees of heat.

A further object is to provide an electrical soldering iron so constructed that it may be kept in a moderately heated state while awaiting use and which will automatically become heated to a degree for practical use when lifted by the operator.

The objects of the invention are accomplished by the construction illustrated in the accompanying drawings in which:—

Figure 1 is a side elevation of the head of a soldering iron partially in central section;

Fig. 2 is a similar view of the handle for the soldering iron showing the switch for controlling one of the electrical heating circuits; and Fig. 3 is a side elevation of the head of a soldering iron with parts thereof cut away and in section showing another arrangement of the heating elements.

Similar characters of reference indicate corresponding parts in both views and referring now to the same:

1 is a soldering core, the shank 2 of which extends into a shell 3, the shank having a threaded extension at its lower extremity that is engaged in the corresponding end of the shell. In making the shell a non-oxidizing metal is used so that the shank of the soldering core will not became imbedded with oxide within the shell and thereby be prevented from being easily withdrawn.

The upper end of the shell 3 has an external flange 5, to which is secured a casing 6, and to the opposite end of the casing is secured a cap 7 into which extends a tube 8 for supporting the soldering iron.

Around the shell 3 is a coating 9 of insulating material through which the terminal wires 10 and 11 extend, and an outer layer 12 of cement or other insulating material extends around the former layer and contains the inner and outer heating coils 13 and 14 respectively. The outer layer 12 of cement is surrounded by an asbestos covering 15 which lies adjacent the inner wall of the casing.

To the lower end of the supporting tube 8 is secured a hollow handle 16 in one side of which is hinged a switch-lever 17 that normally projects outwardly from the handle, a spring-plate 18 secured within the handle and attached to the lever serving as a hinge. A switch member 19 is secured within the handle and a co-operating switch member 20 is secured to the inner side of the lever 17 so that when the lever is pressed inwardly the switch members become engaged in contact with each other.

Electrical feed wires 21 and 22 have respective connections with a terminal block 23 within the handle, and the feed wire 22 has connection directly with each of the heating coils 13 and 14 through the medium of the terminal wires 10 and 11 and the connecting wire 24. The inner heating coil 13 has connection with the feed wire 21 and also with the switch member 20, through the medium of the connecting wire 25, and the outer heating coil 14 has connection with the switch member 19 through the medium of the connecting wire 26.

In the form shown in Fig. 3 two heating elements 27 and 28 are imbedded in a layer of cement 12' that surrounds the shell 3', the elements being arranged with the coils of one intervening between those of the other and both having connection at their lower ends with a connecting wire 24'. One of the elements has connection at its opposite end with a connecting wire 25' and the other element has similar connection with a connecting wire 26', each of the connecting wires being continuations respectively of the connecting wires 24, 25 and 26 shown in Fig. 2, so that electrical current is applied to the elements and controlled in similar manner to the foregoing instance. By arranging the elements so that the coils of one intervene between those of the other admits of winding both elements in close proximity to the shell with correspondingly increased efficient result.

In the operation of the invention, when current is supplied through the feed wires, one heating coil becomes active and the soldering core consequently becomes heated, the latter being so proportioned that the degree of heat attained by it will be insufficient to injure the heating element even though its attained temperature be protracted indefinitely. When the operator grasps the handle, the lever thereby becomes moved inwardly so that the switch members become closed into contact with each other, thus closing the electrical circuit through the other heating coil whereupon it also becomes active and the heat of the soldering core becomes intensified so that the iron becomes sufficiently heated for use. As the operator lays the instrument down and releases this grasp of the handle the switch-lever is moved outwardly by the spring hinge, thus parting the switch members so that the circuit through the outer heating coil is broken.

The connections of the two heating coils with the feed-wires are in multiple so that the operation or discontinuation of one heating coil effects no interruption of the other heating coil. By the arrangement herein disclosed the soldering iron becomes heated to the high degree necessary for operation only at such times as it is being actively applied and is maintained in a more moderately heated state while awaiting use. In this manner the life of the instrument is prolonged and the heating element is saved from the deteriorating effects of overheating.

What I claim is:—

1. In a soldering iron, a shell; a soldering core, the shank of which extends into the shell; two separate heating coils positioned around the shell; a handle including means for supporting the shell; a switch lever in hinged connection with the handle and forming a movable part thereof; a pair of switch members, one having connection with the lever and the other with the handle proper and being adapted to be brought together by movement of the lever; and feed-wires having direct means of connection with one of said heating coils and through the medium of said switch members with the other heating coil.

2. In an electrical soldering iron including a soldering core and supporting handle; two separate resistance coils for heating the core; a lever having hinged connection with the handle adapted to be actuated by the operator in grasping the handle; a switch adapted to be closed when the lever is actuated; and electrical means for constantly maintaining current through one of said coils and intermittingly through the other coil governable by the switch.

In testimony whereof I affix my signature, in presence of two witnesses.

WILLIAM A. BRAUN.

Witnesses:
F. H. WALDRON,
V. V. BREMYER.